(12) United States Patent
Wildfellner

(10) Patent No.: US 7,204,337 B2
(45) Date of Patent: Apr. 17, 2007

(54) OVERLOAD COUPLING

(75) Inventor: Kurt Wildfellner, Neukirchen bei Lambach (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 348 days.

(21) Appl. No.: 10/768,653

(22) Filed: Feb. 2, 2004

(65) Prior Publication Data
US 2004/0149508 A1 Aug. 5, 2004

Related U.S. Application Data

(60) Provisional application No. 60/443,841, filed on Jan. 31, 2003.

(51) Int. Cl.
*B62D 21/00* (2006.01)

(52) U.S. Cl. ...................... 180/292; 180/293

(58) Field of Classification Search ............... 180/295, 180/338, 343, 364, 291, 292, 293
See application file for complete search history.

(56) References Cited

U.S. PATENT DOCUMENTS

| 3,997,043 A | 12/1976 | Kondo et al. |
| 4,540,061 A | 9/1985 | Watanabe |
| 4,735,105 A | 4/1988 | Kumazawa |
| 5,150,637 A * | 9/1992 | Ninomiya et al. ............ 74/335 |
| 6,062,330 A * | 5/2000 | Watson et al. ............. 180/248 |
| 6,079,535 A * | 6/2000 | Mueller et al. ............ 192/48.2 |
| 6,484,857 B2 * | 11/2002 | Vonnegut et al. ............. 192/35 |
| 6,588,559 B2 * | 7/2003 | Blair ........................... 192/20 |
| 6,589,128 B2 * | 7/2003 | Bowen ......................... 475/5 |
| 6,691,845 B2 * | 2/2004 | Showalter .................... 192/35 |

FOREIGN PATENT DOCUMENTS

| JP | 02-138549 | 5/1990 |
| JP | 2002-068070 | 3/2002 |

* cited by examiner

*Primary Examiner*—Christopher P. Ellis
*Assistant Examiner*—Brian Swenson
(74) *Attorney, Agent, or Firm*—Osler, Hoskin & Harcourt LLP

(57) ABSTRACT

A drive assembly for a vehicle having at least one wheel and an engine is disclosed. The drive assembly transfers a driving force from the engine to the at least one wheel. The drive assembly includes a rotatable input drive shaft. The input drive shaft is operatively coupled to the engine. The drive assembly further includes a rotatable output drive shaft. The output drive shaft is operatively coupled to the at least one wheel. A first transmission operatively connects the input and output drive shafts. An overload clutch is operatively disposed between the input drive shaft and the first transmission to transfer a driving force from the input drive shaft to the first transmission. The overload clutch may be at least partially mounted to input drive shaft.

19 Claims, 4 Drawing Sheets

OVERLOAD COUPLING

CROSS REFERENCE TO RELATED APPLICATION

This application relates to and claims priority to U.S. Provisional Patent Application No. 60/443,841, filed on Jan. 31, 2003, which is incorporated herein specifically by reference.

BACKGROUND OF THE INVENTION

1. Field of the Invention

The present invention relates to a drive assembly for a vehicle having an overload coupling between a drive shaft and a driving pinion to limit the transmission of excessive and damaging torques through the drive assembly. The overload coupling includes an overload clutch.

2. Description of Related Art

Various manual transmissions for internal combustion engine driven vehicles are known in the art. In a typical arrangement, an internal combustion engine provides a driving force to drive a drive shaft through suitable engine gearing (i.e., drive assembly). This can be accomplished by a belt-driven constant velocity transmission ("CVT") that acts, preferably through a manual transmission, on a driven shaft that is connected to at least one driving wheel. A forward gear, a reverse gear, or neutral positions can be selected as desired by the manual transmission.

In known drive assemblies, a centrifugal clutch and a CVT provide variable transmission ratios. The clutch and CVT are incorporated between the internal combustion engine and the toothed gearing of the drive assembly. The CVT drives the toothed gearing of the drive assembly and thus moves the vehicle. It is preferred that the driving assembly provide a plurality of speeds, for example, a fast forward gear, a slow forward gear and a reverse gear. One particular problem with this drive concept has been that, in particular when the transmission is subjected to large impact loads in the drive train, such as those that occur, for example, when the vehicle jumps, the gearing will fail or be damaged and possibly destroyed after a number of such load reversals. These load peaks in the drive assembly are caused in particular because the high moment of inertia of the CVT and the gear ratio of the toothed gearing of the drive assembly make the drive assembly particularly stiff so that it cannot attenuate the load peaks that occur. This leads to load peaks, in particular at the output of the drive assembly of the output shaft. These impact loads stem from the difference between the absolute speed of the motor vehicle that is jumping and the circumferential velocity of the wheels of the motor vehicle which, when they land after the jump, dig into the ground with almost no slip.

Conventional drive assemblies such as the one disclosed in U.S. Pat. No. 3,997,043 include an overload clutch disposed between the transmission and the wheel of the vehicle. The overload clutch disengages when a torque transmitted therethrough exceeds a predetermined value so that the overload torque does not damage the transmission. Such overload clutches must be large to withstand the relatively large torques that are generated in the gear train between the transmission and the wheels.

SUMMARY OF THE INVENTION

It is therefore one aspect of one or more embodiments of this invention to provide an overload clutch that is smaller, more durable, and/or less expensive than conventional overload clutches.

It is another aspect of one or more embodiments of the present invention to provide an overload clutch that is positioned between the engine and the transmission, instead of between the transmission and the wheels.

It is another aspect of embodiments of the present invention to create a drive assembly of the type described heretofore for a motor vehicle where excessive load peaks in the drive train can be avoided without having to abandon the proven drive concept. It is also to be possible to avoid peak loads of this kind by retrofitting existing drive trains.

This objective is achieved by embodiments of the present invention whereby an overload clutch is included as part of the drive assembly. This solves the problem by suppressing excessive torques and load peaks in the drive assembly in a particularly simple and elegant manner without any negative effects on the normal operation of the drive assembly. The design of the overload clutch is such that it can transfer the maximal engine torque and any minor shock loads that may occur reliably. The arrangement only reduces excessive shocks whereby it releases the connection between the CVT and the drive shaft of the wheels (i.e., the output shaft)—which is rigid during normal operation—for brief periods so as to reduce the load peaks.

Depending on the amount of space that may be available, the overload clutch is installed in the drive assembly between the input shaft and the output shaft of the drive assembly. It is particularly advantageous if the overload clutch is arranged on the input shaft because the output torque that is to be limited to a maximum value on the output shaft can be reduced by the transmission ratio of the drive assembly so that the torque that is to be limited in the drive train is also reduced by this transmission ratio, which means that the overload clutch can be made smaller. This in turn also reduces production costs.

In order to minimize the installed size, it is an advantage if a drive pinion for the drive assembly be mounted on the input shaft so as to be able to rotate thereon, the drive pinion is positively connected to the drive shaft by way of the overload clutch so as to form a drive connection. According to one advantageous configuration of the present invention, on the drive side the overload clutch is connected to the input shaft so as to rotate in unison with it, and on the output side it is connected to the driving pinion of the toothed gearing so as to rotate in unison with it. As an alternative to this, the overload clutch could be built into a two-part drive shaft, on both the output side and the input side.

In accordance with an aspect of embodiments of the present invention, a drive assembly for a vehicle having at least one wheel and an engine is disclosed. The drive assembly transfers a driving force from the engine to the at least one wheel. The drive assembly includes a rotatable input drive shaft. The input drive shaft is operatively coupled to the engine. The drive assembly further includes a rotatable output drive shaft. The output drive shaft is operatively coupled to the at least one wheel. The drive assembly also includes a first transmission operatively connecting the input shaft to the output shaft. The first transmission has a plurality of transmission ratios. An overload clutch is operatively disposed between the input shaft and the first transmission to transfer a driving force from the input drive shaft to the first transmission. The overload clutch has an engaged position such that the overload clutch transfers the driving force from the input drive shaft to the first transmission during a first operating condition. The overload clutch also has a disengaged position such that the driving force is not transferred from the input drive shaft to the first transmission during a second operating condition.

During the first operating condition, the torque transferred through the input drive shaft is below a predetermined threshold value. During the second operating condition, the torque transferred through the input drive shaft exceeds the predetermined threshold value.

The drive assembly can also include an engine and a second transmission operatively connecting the engine to the input shaft. The second transmission is a continuous variable transmission having a continuously variable transmission ratio. The second transmission includes a drive pulley and a driven pulley coupled by a coupling member. The driven pulley of the second transmission may be positioned on the input shaft.

The first transmission may include one or more forward gears, a neutral gear, and a reverse gear. The first transmission may be a manual gear shifting device.

The overload clutch shifts to the first operating condition when a torque transferred therethrough falls below a predetermined threshold value. Conversely, the overload clutch shifts to the second operating condition when the torque exceeds the predetermined threshold value.

The drive assembly can further include a driving pinion operatively connected to the input drive shaft. The overload clutch operatively connects the driving pinion to the input drive shaft, whereby the driving force is selectively transmitted from the input drive shaft through the overload clutch to the driving pinion. During the first operating condition, the torque transferred through the input drive shaft is below a predetermined threshold value, whereby the driving force is transferred from the input drive shaft to the driving pinion. During the second operating condition, the torque transferred through the input drive shaft exceeds the predetermined threshold value, whereby the driving force is not transferred from the input drive shaft to the driving pinion.

In accordance with the present invention, the overload clutch can include at least one friction plate operatively connected to the drive pinion and at least one clutch plate operatively connected to the input drive shaft. At least one spring is provided for applying an engaging force such that the at least one friction plate is coupled to the at least one clutch plate, whereby the driving force is transferred from the input drive shaft to the driving pinion. The predetermined threshold valve is defined by the engaging force applied by the at least one spring.

The input drive shaft can include a flange formed thereon. The at least one clutch plate is operatively coupled to the flange by a connecting pin.

A reduction of construction costs can be achieved if the driving pinion is mounted on the drive shaft between the overload clutch and a disk spring pack, so as to be able to rotate thereon, and optionally the disk spring pack causes a spring force to act on the driving pinion in the direction of the drive shaft axis, against the overload clutch, in the closing direction of the overload clutch. The at least one friction plate, the at least one clutch plate and the at least one spring can be positioned between the flange and the drive pinion. The spring can be positioned between the flange and either the at least one friction plate or the at least one clutch plate. The at least one spring can alternatively be positioned between the drive pinion and either the at least one friction plate or the at least one clutch plate. It is also contemplated that the drive pinion, the at least one friction plate, and the at least one clutch plate can be positioned between the flange and the at least one spring.

According to a further aspect of one or more embodiments of this invention, the drive assembly is incorporated into an all-terrain vehicle. The all-terrain vehicle has a frame, four wheels disposed on the frame, a straddle seat supported by the frame, and an engine supported by the frame. The drive assembly operatively connects the engine to at least one of the four wheels.

Such an overload clutch can also be retrofitted to existing drive assemblies by replacing some minor components in existing drive assembly without having to incur any great costs. Using such measures, it is possible to significantly increase the service life of a drive assembly, since the loading on all shafts, wheels, and bearing can be limited to an insignificant maximal value.

BRIEF DESCRIPTION OF THE DRAWINGS

The invention will now be described in conjunction with the following drawings in which like reference numerals designate like elements and wherein.

DETAILED DESCRIPTION OF PREFERRED EMBODIMENTS

Figure 1:
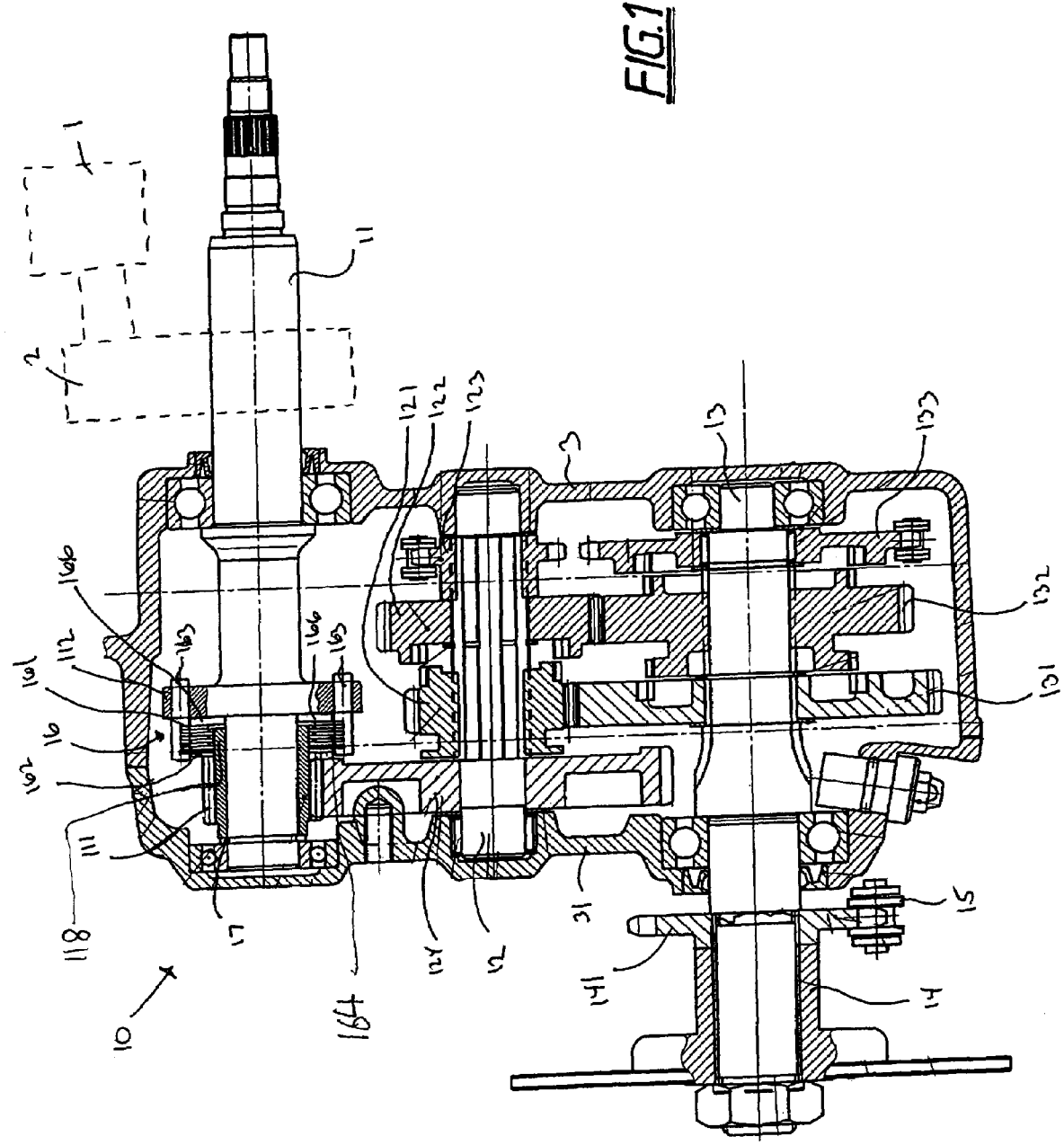
FIG. 1 is a partial side cross-sectional view of an overload coupling for a drive assembly in accordance with an embodiment of the present invention.

A drive assembly 10 for use in connection with an internal combustion engine is illustrated in FIG. 1. The drive assembly 10 can be used in connection with a suitable vehicle including but not limited to an all terrain vehicle, a go-kart, a three-wheeled vehicle, a snowmobile, a motorcycle or any other suitable vehicle. The drive assembly may be incorporated into an all-terrain vehicle such as the ones disclosed in U.S. Pat. Nos. 6,296,073 and 4,699,234, the contents of which are incorporated herein by reference. The drive assembly 10 is operatively connected to the wheel(s) of the vehicle to drive the same.

The drive assembly 10 includes an input drive shaft 11. The input drive shaft 11 is operatively connected to a driver pulley of a CVT 2, as disclosed, for example, in U.S. patent application Ser. No. 10/395,844 entitled "Braking Mechanism for a Gear," which is assigned to the Assignee of the present application and incorporated herein specifically by reference. The CVT 2 is operatively connected to the internal combustion engine 1. The engine 1 may be either a two cycle or a four cycle engine. The present invention is not limited to internal combustion engines; rather, other engines are considered to be within the scope of the present invention.

The input drive shaft 11 is rotatably mounted to a gearbox 3. The gearbox 3 has a gearbox cover 31. The input drive shaft 11 can be formed as a single component or two or more interconnected components. The input drive shaft 11 is operatively connected to an intermediate drive shaft 12, as described in greater detail below. The intermediate drive shaft 12 is rotatably mounted within the gearbox 3. The intermediate drive shaft 12 is operatively connected to an output drive shaft 13. The output drive shaft 13 is rotatably mounted to the gearbox 3. The rotational drive force of the output drive shaft 13 is transferred to the wheel(s) through an appropriate sprocket or linkage 14 secured to the end of the shaft 13. The sprocket or linkage 14 includes a toothed gear 141, which receives a chain 15 for driving the wheel(s). The present invention is not intended to be limited to the linkage 14; rather, it is contemplated that other suitable means for transferring the drive force to the wheel(s), including but not limited to a direct connection to the wheel or a gear linkage without chains are considered to be well within the scope of the present invention.

The intermediate drive shaft 12 is operatively coupled to the output drive shaft 13 by a transmission that includes three transmission ratios, which include a slow forward gear, a fast forward gear, and a reverse gear. The intermediate drive shaft 12 includes a slow forward gear 121, a first forward gear 122 and a reverse gear 123. The output drive shaft 13 includes a slow forward gear 131, a fast forward gear 132 and a reverse gear 133, which are aligned with the gears 121, 122, and 123, respectively, a shown in FIG. 1. The shifting between gears can be performed using a shifting mechanism such as, for example, the mechanism disclosed in U.S. patent application Ser. No. 10/395,844, the disclosure of which is incorporated specifically herein by reference, or any conventional shifting mechanism including but not limited to gear shift forks. The shifting mechanism may alternatively comprise any other shifting mechanism that is known to those of ordinary skill in the art without deviating from the scope of this invention.

The intermediate drive shaft 12 further includes an intermediate drive pinion 124. The intermediate drive pinion 124 is operatively coupled to a driving pinion 111 mounted on one end of the input drive shaft 11. The rotational force of the input drive shaft 11 is transferred through the driving pinion 111 to the intermediate drive pinion 124 and the intermediate drive shaft 12.

Figure 2:
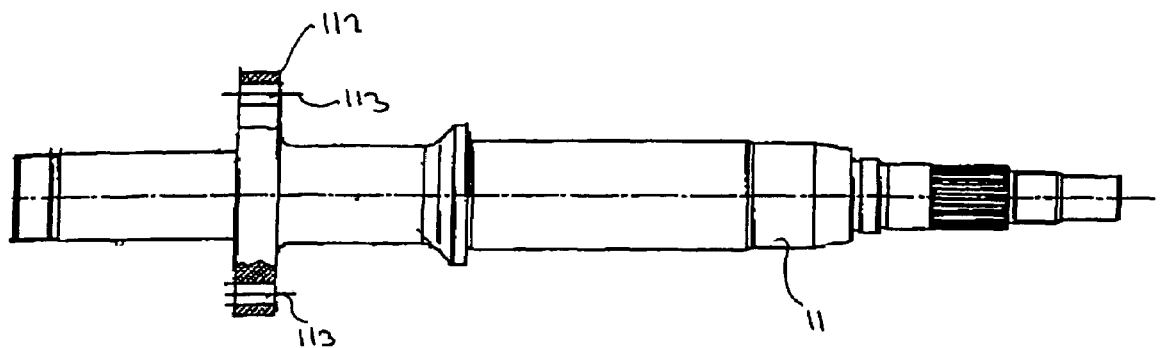
FIG. 2 is a side schematic view of the input drive shaft for the overload coupling of FIG. 1.
Figure 3:
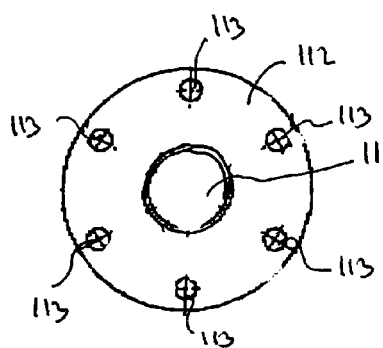
FIG. 3 is an end schematic view of the input drive shaft of FIG. 2.
Figure 6:
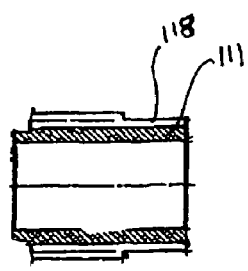
FIG. 6 is a side cross-sectional view of a drive pinion for use in the overload coupling of FIG. 1.
Figure 4:
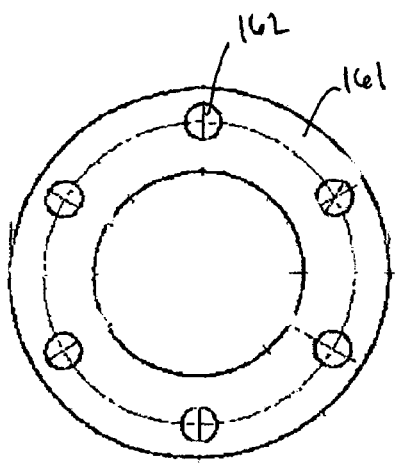
FIG. 4 is side schematic view of an outer clutch plate for use in embodiments of the overload coupling.

The interaction between the input drive shaft 11 and the driving pinion 111 will now be described in greater detail. The driving pinion 111 is rotatably mounted to the input drive shaft 11 via an appropriate bearing, such as a bushing or roller bearing. The input drive shaft includes a flange 112, as shown in FIG. 1. The flange 112 includes a plurality of openings 113 formed therein, as shown in FIGS. 2 and 3. A retaining ring 17 is provided to limit the axial movement of the driving pinion 111 on the drive shaft 11. The drive shaft 11 is operatively coupled to the driving pinion 111 through an overload clutch 16. The overload clutch 16 includes a plurality of outer clutch plates 161, as shown in FIG. 1. Each outer plate 161 has a plurality of openings 162 formed therein, as shown in FIG. 4, which correspond to the openings 113 in the flange 112. The overload clutch 16 limits the transmission of excessive torque loads between the input shaft 11 and the shafts 12, 13.

Figure 5:
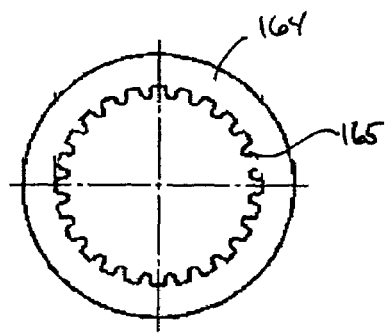
FIG. 5 is side schematic view of an internal geared friction plate for use in embodiments of the overload coupling.

A pin 163 is received within each of the openings 113, 162 to link the clutch plates 161 to the flange 112. Each pin 163 is attached to the flange 112 by force fitting or other suitable attachment mechanism. A plurality of internal geared friction plates 164 are positioned between the clutch plates 161 such that each friction plate 164 is sandwiched between the two adjacent clutch plates 161. As shown in FIG. 5, each friction plate 164 has an internal gear 165 that engages a complementary gear 118 on the driving pinion 111. At least one disc spring 166 or pack, which contains a plurality of springs is provided between the flange 112 and one of the outer clutch plates 161 to provide the necessary axial force between the friction plates 164 and the clutch plates 161. The overload clutch 16 limits the excessive torque that can be transferred from the input drive shaft 11 to the intermediate drive shaft 12. The overload clutch 16, the drive pinion 111 and the drive shaft 11 together form an overload coupling.

During normal operation, the drive force from the engine 1 is transferred to the drive assembly 10 through the CVT 2 such that input drive shaft 11 rotates. The rotational force of the drive shaft 11 is transferred to the drive pinion 111 through the overload clutch 16. In particular, the rotational force is transferred to the pins 163 that connect the flange 112 to the clutch plates 161. The axial force is supplied by the spring pack 166 causing the plates 161 to frictionally engage the friction plates 164 such that the rotational force is effectively transferred from the plates 161 to the plates 164, which in turn rotate the drive pinion 111. The shafts 11 and drive pinion 111 therefore rotate in unison and the drive pinion drives the intermediate shaft 12.

When an excessive shock or torque occurs during, for example, vehicle jump or abrupt change of gears, the rotational force exceeds a threshold torque value whereby the friction plates 164 slip with respect to the clutch plates 161, which effectively prevents the passage of excessive torques through the overload clutch 16. As such, excessive loads may not be transferred from the drive shaft 11 to the intermediate drive shaft 12 or vice versa. The shafts 11 and 12 momentarily do not operate in unison. This avoids potential damage to the pinions 111 and 124 and the gears in the event of an excessive load or shock.

The transmission includes various transmission ratios that increase the torque and decrease the speed of the input shaft 11 relative to the output shaft 13. The overload clutch 16 experiences significantly lower torque than the output shaft 13. Consequently, the overload clutch 16 can be more compact and less expensive than conventional overload clutches, which are positioned on the higher torque output shaft 13 (or elsewhere between the transmission and the wheels of the vehicle) and must therefore be constructed to withstand significantly higher torque.

The drive assembly 10 may also include additional clutches. For example, as disclosed in U.S. patent application Ser. No. 10/395,844 entitled "Braking Mechanism for a Gear," a free wheel clutch and a centrifugal clutch may be disposed between the driven pulley of the CVT 2 and the input drive shaft 11. However, unlike overload clutches, such free wheel and centrifugal clutches do not prevent torque shocks.

The input drive shaft 11, the drive pinion 111 and the overload clutch 16 can be easily retrofitted into an existing drive assembly. The existing drive shaft and drive gear can be replaced with the above-described drive shaft 11, drive pinion 111 and overload clutch 16. As such, an existing drive assembly can be retrofitted with an overload coupling.

Figure 7:
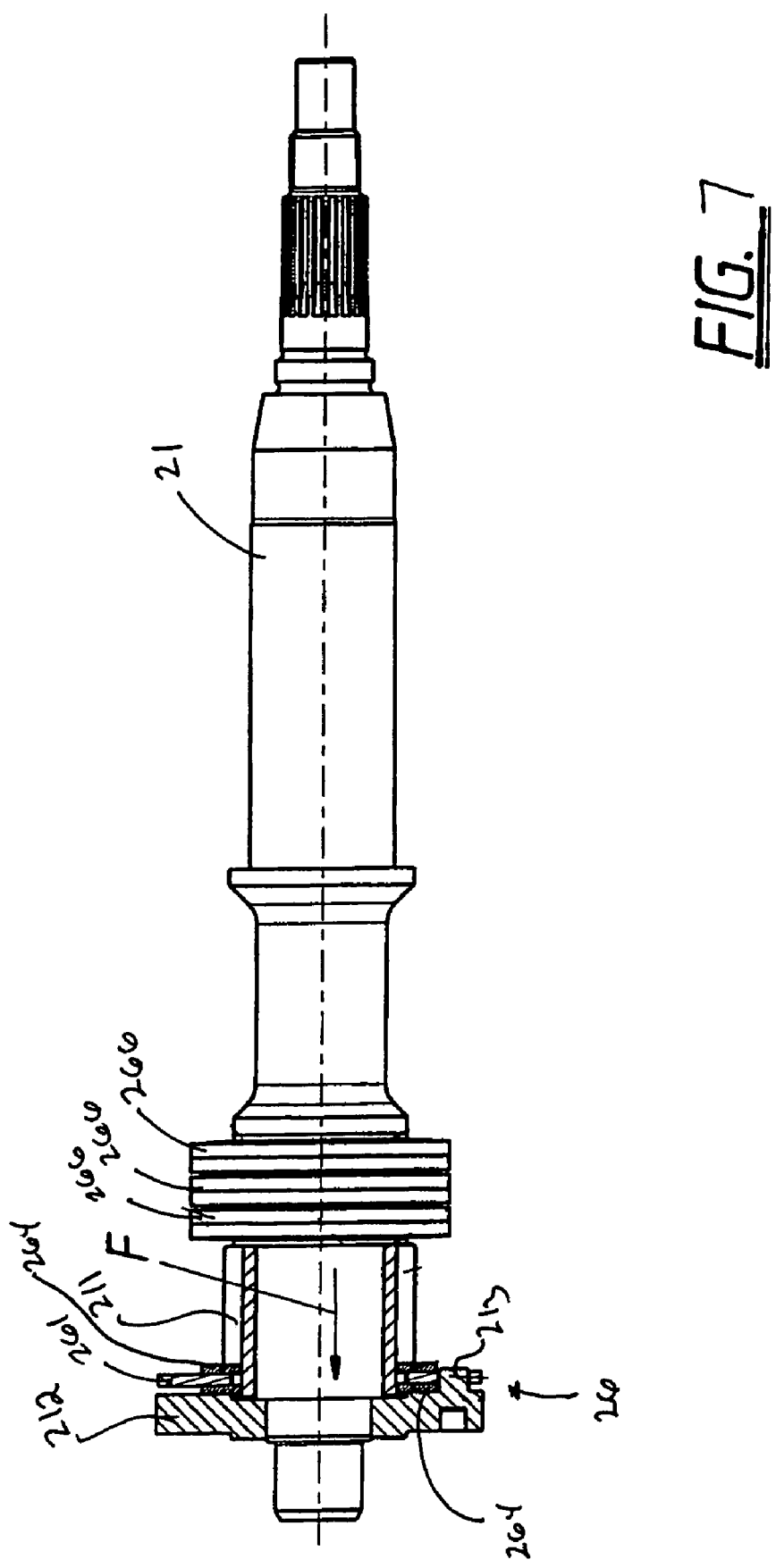
FIG. 7 is a partial side cross-sectional view of an overload coupling for a drive assembly in accordance with another embodiment of the present invention.

An overload coupling according to another embodiment of the present invention will be described in connection with FIG. 7. In FIG. 7, the overload coupling includes an input drive shaft 21. Like the drive shaft 11, the drive shaft 21 is rotatably mounted within the gearbox 3. A driving pinion 211 is rotatably mounted on the drive shaft 21. The driving pinion 211 operatively engages the intermediate drive pinion 124 to transfer the rotational force from the drive shaft 21 to the intermediate drive shaft 12.

A fixed bush 212 is connected to one end of the input drive shaft 21. The fixed bush 212 can be secured to the end of the shaft 21, molded onto shaft 21, force fitted, integrally formed with the shaft 21, or otherwise secured to the shaft 21. The driving pinion 211 is positioned between the fixed bush 212 and at least one spring pack 266. The spring pack(s) 266 apply a force on the driving pinion 211 in direction F towards the fixed bush 212.

An overload clutch 26 connects the driving pinion 211 to the input drive shaft 21. The overload clutch 26 includes at least one outer clutch plate 261. The outer clutch plate 261 can have the same construction as the outer clutch plate 161. A pin 213 that extends from the fixed bush 212 is received within an opening in the clutch plate 261, as shown in FIG. 7. The pin 213 can be integrally formed with the fixed bush 212 or formed as a separate component. The overload clutch 26 further includes at least one friction plate 264. The friction plates 264 have a similar construction to the friction plate 164, shown in FIG. 5. The friction plates 264 are positioned between the fixed bush 212 and the outer clutch plate 261 and between the outer clutch plate 261 and the splines of the driving pinion 211, as shown in FIG. 7. The force exerted by the spring packs 266 causes the friction plates 264 to engage the outer clutch plate 261 such that the rotational forces transmitted from the bush 212 to the clutch plate 261 through pin 213 is transferred to the friction plates 264 which causes the driving pinion 211 to rotate in unison with the drive shaft 21.

When excessive shocks or loads occur, the rotational forces exceed a threshold torque value (i.e., the force exerted by the spring packs 266), whereby the friction plates 264 slip with respect to the clutch plates 261, which effectively prevents the passage of excessive torques through the overload clutch 26. As such excessive loads may not be transferred from the drive shaft 21 to the intermediate shaft 12 or vice versa. The shafts 21 and 12 momentarily do not operate in unison.

Figure 8:
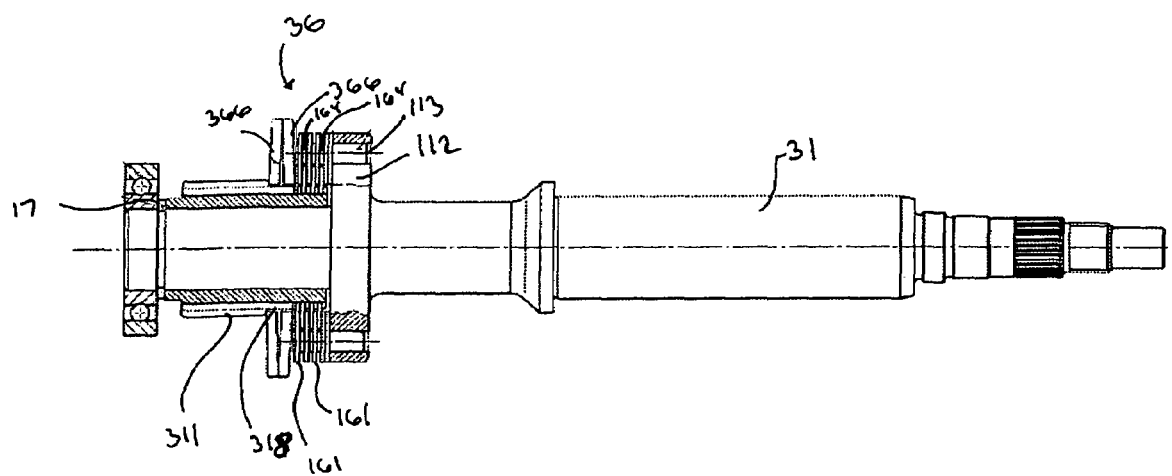
FIG. 8 is a partial side cross-sectional view of an overload coupling for a drive assembly in accordance with another embodiment of the present invention.

An overload coupling according to another embodiment of the present invention will be described in connection with FIG. 8. In FIG. 8, the overload coupling includes an input drive shaft 11 having a flange 112 formed thereon. A retaining ring 17 is provided to limit the axial displacement of the driving pinion 311 with respect to the drive shaft 11. As shown in FIGS. 2 and 3, the flange 112 includes a plurality of openings 113. The drive shaft 11 is operatively coupled to the driving pinion 311 through an overload clutch 36. The overload clutch 36 includes a plurality clutch plates 161 and friction plates 164 in the manner described above in connection with the clutch 16. The friction plates 164 engage the gear 318 on the pinion 311. The location of the spring packs differ. In the overload clutch 36, the spring packs 366 are positioned between the splines of the driving pinion 311 and the clutch plates 161 and friction plates 164. With this arrangement, the clutch plates 161 and the friction plates 164 are compressed between the spring pads 366 and the flange 112. With such an arrangement, the maximal torque can be transmitted from drive shaft 11 to the driving pinion 311 through the overload clutch 36 whereby the shaft 11 operates in unison with the pinion 211.

When excessive shocks or loads occur, the rotational forces exceed a threshold value (i.e., the force exerted by the spring packs 366), whereby the friction plates 164 slip with respect to the clutch plates 161, which effectively prevents the passage of excessive torques.

While the invention has been described in connection with what is presently considered to be the most practical and preferred embodiments, it is to be understood that the invention is not to be limited to the disclosed embodiments and elements, but, to the contrary, is intended to cover various modifications, equivalent arrangements, and equivalent elements included within the spirit and scope of the appended claims. The input drive shaft 11 and 21 could also be formed in two parts, the overload clutch 16, 26, 36 then being arranged between the two parts of the input drive shaft.

What is claimed is:

1. A drive assembly for a vehicle having at least one wheel and an engine, wherein the drive assembly transfers a driving force from the engine to the at least one wheel, the drive assembly comprising:
    a rotatable input drive shaft, wherein the input drive shaft is operatively coupled to the engine;
    a rotatable output drive shaft, wherein the output drive shaft is operatively coupled to the at least one wheel;
    a first transmission operatively connecting the input shaft to the output shaft, the first transmission having a plurality of transmission ratios; and
    an overload clutch operatively disposed between the input drive shaft and the first transmission to transfer a driving force from the input drive shaft to the first transmission, wherein the overload clutch has an engaged position such that the overload clutch transfers the driving force from the input drive shaft to the first transmission during a first operating condition, wherein the overload clutch has a disengaged position such that the driving force is not transferred from the input drive shaft to the first transmission during a second operating condition.

2. The drive assembly according to claim 1, further comprising:
    an engine; and
    a second transmission operatively connecting the engine to the input shaft, wherein the a second transmission is a continuous variable transmission having a continuously variable transmission ratio.

3. The drive assembly according to claim 2, wherein the second transmission comprises a drive pulley and a driven pulley coupled by a coupling member.

4. The drive assembly according to claim 3, wherein the driven pulley of the second transmission is positioned on the input shaft.

5. The drive assembly according to claim 1, wherein the first transmission comprises a forward gear.

6. The drive assembly according to claim 5, wherein the first transmission comprises at least two forward gears.

7. The drive assembly according to claim 5, wherein the first transmission comprises a reverse gear.

8. The drive assembly according to claim 1, wherein the first transmission comprising a manual gear shifting device.

9. The drive assembly according to claim 1, wherein the overload clutch shifts to the first operating condition when a torque transferred therethrough falls below a predetermined threshold value, and wherein the overload clutch shifts to the second operating condition when the torque exceeds the predetermined threshold value.

10. The drive assembly according to claim 1, wherein the overload clutch is at least partially positioned on the input drive shaft.

11. The drive assembly according to claim 1, further comprising:
a driving pinion operatively connected to the input drive shaft, wherein the overload clutch operatively connects the driving pinion to the input drive shaft, whereby the driving force is selectively transmitted from the input drive shaft through the overload clutch to the driving pinion.

12. The drive assembly according to claim 11, wherein the overload clutch comprises:
at least one friction plate operatively connected to the drive pinion;
at least one clutch plate operatively connected to the input drive shaft; and
at least one spring for applying an engaging force such that the at least one friction plate is coupled to the at least one clutch plate, whereby the driving force is transferred from the input drive shaft to the driving pinion.

13. The drive assembly according to claim 12, wherein during the first operating condition, the torque transferred through the input drive shaft is below a predetermined threshold value, whereby the driving force is transferred from the input drive shaft to the driving pinion.

14. The drive assembly according to claim 13, wherein the predetermined threshold value is defined by the engaging force applied by the at least one spring.

15. The drive assembly according to claim 12, wherein the input drive shaft includes a flange formed thereon, wherein the at least one clutch plate is operatively coupled to the flange.

16. The drive assembly according to claim 15, further comprising at least one pin connecting the flange to the at least one clutch plate.

17. The drive assembly according to claim 15, wherein the drive pinion, the at least one friction plate, and the at least one clutch plate are positioned between the flange and the at least one spring.

18. The drive assembly according to claim 12, wherein the at least one spring includes at least one disk spring.

19. An all-terrain vehicle comprising:
a frame;
four wheels disposed on the frame;
a straddle seat supported by the frame;
an engine supported by the frame; and
a drive assembly disposed on the frame and comprising
a rotatable input drive shaft operatively coupled to the engine,
a rotatable output drive shaft operatively coupled to the at least one of the four wheels,
a first transmission operatively connecting the input shaft to the output shaft, the first transmission having a plurality of transmission ratios, and
an overload clutch operatively disposed between the input drive shaft and the first transmission to transfer a driving force from the input drive shaft to the first transmission, wherein the overload clutch has an engaged position such that the overload clutch transfers the driving force from the input drive shaft to the first transmission during a first operating condition, wherein the overload clutch has a disengaged position such that the driving force is not transferred from the input drive shaft to the first transmission during a second operating condition.

* * * * *